(12) United States Patent
Nagata et al.

(10) Patent No.: US 6,995,197 B2
(45) Date of Patent: Feb. 7, 2006

(54) TRANSPARENT IMPACT-RESISTANT THERMOPLASTIC RESIN COMPOSITION

(75) Inventors: Norio Nagata, Kakogawa (JP); Yakushu Chin, Akashi (JP); Mamoru Kadokura, Himeji (JP)

(73) Assignee: Kaneka Corporation, Osaka (JP)

( * ) Notice: Subject to any disclaimer, the term of this patent is extended or adjusted under 35 U.S.C. 154(b) by 240 days.

(21) Appl. No.: 10/048,454

(22) PCT Filed: Jul. 6, 2001

(86) PCT No.: PCT/JP01/05873

§ 371 (c)(1),
(2), (4) Date: Feb. 5, 2002

(87) PCT Pub. No.: WO02/04559

PCT Pub. Date: Jan. 17, 2002

(65) Prior Publication Data

US 2002/0156183 A1 Oct. 24, 2002

(30) Foreign Application Priority Data

Jul. 11, 2000 (JP) .............................. 2000-210355

(51) Int. Cl.
*C08L 51/00* (2006.01)
(52) U.S. Cl. ................... 523/201; 525/70; 523/335
(58) Field of Classification Search ........... 523/201, 523/335; 525/70
See application file for complete search history.

(56) References Cited

U.S. PATENT DOCUMENTS

| | | | | |
|---|---|---|---|---|
| 4,419,496 A | * | 12/1983 | Henton et al. | 525/301 |
| 4,487,890 A | * | 12/1984 | Kishida et al. | 525/193 |
| 4,798,867 A | * | 1/1989 | Nakai et al. | 525/196 |
| 4,857,631 A | * | 8/1989 | Moore | 528/481 |
| 5,244,940 A | * | 9/1993 | Riess et al. | 523/335 |
| 5,336,720 A | * | 8/1994 | Richards et al. | 525/78 |
| 5,346,954 A | * | 9/1994 | Wu et al. | 525/85 |
| 5,470,895 A | * | 11/1995 | Kidder et al. | 523/335 |
| 5,559,187 A | | 9/1996 | Maeda et al. | |
| 5,798,414 A | | 8/1998 | Mishima et al. | |
| 5,955,540 A | * | 9/1999 | Dion et al. | 525/71 |
| 6,656,999 B1 | * | 12/2003 | Lee et al. | 524/502 |
| 2003/0092803 A1 | * | 5/2003 | Vanhoorne et al. | 524/99 |

FOREIGN PATENT DOCUMENTS

| | | |
|---|---|---|
| JP | 61-130365 | 6/1986 |
| JP | 10-245468 | 9/1998 |
| JP | 11-1522 | 1/1999 |

* cited by examiner

*Primary Examiner*—Jeffrey Mullis
(74) *Attorney, Agent, or Firm*—Westerman, Hattori, Daniels & Adrian, LLP

(57) ABSTRACT

An aromatic vinyl resin composition comprising (A) 5 to 40% by weight of a graft copolymer obtained by polymerizing 15 to 60 parts by weight of (a4) a vinyl monomer in the presence of 85 to 40 parts by weight of rubber particles (total of vinyl monomer and rubber being 100 parts by weight) having an average particle size of 3,500 to 20,000 angstroms obtained by adding, to a latex of a rubber having an average particle size of 500 to 3,000 angstroms and comprising (a1) 50 to 100% by weight of a diene monomer, (a2) 50 to 0% by weight of a vinyl monomer and (a3) 0 to 3% by weight of a crosslinking monomer, 0.1 to 15 parts by weight of an acid group-containing copolymer per 100 parts by weight of the rubber to agglomerate the rubber particles to enhance the particle size thereof, and (B) 95 to 60% by weight of an aromatic vinyl resin comprising (b1) 40 to 100% by weight of an aromatic vinyl monomer, (b2) 60 to 0% by weight of a methacrylic ester and (b3) 0 to 20% by weight of other vinyl monomer. The composition provides molded articles having an improved impact resistance without impairing properties of the aromatic vinyl resin such as heat resistance and transparency.

15 Claims, No Drawings

TRANSPARENT IMPACT-RESISTANT THERMOPLASTIC RESIN COMPOSITION

TECHNICAL FIELD

The present invention relates to a transparent, impact resistant thermoplastic resin composition, and more particularly to a resin composition having well balanced strength, transparency and processability wherein an impact resistance is imparted to an aromatic vinyl resin without impairing its transparency. The composition is applicable to fields that require moldings of aromatic vinyl resins to have sufficient strength and transparency, and is suitable for various uses such as lighting cover, various transparent containers and medical appliances.

BACKGROUND ART

Of thermoplastic resins, aromatic vinyl resins occupy a relatively large proportion of uses. A representative aromatic vinyl resin is copolymers of an aromatic vinyl monomer and an acrylic ester monomer. Such resins having various compositions are put on the market. However, in general they are not sufficient for market demands in strength. Accordingly, various manners to improve the impact strength have been adopted. For example, JP-A-52-8095 and JP-B-55-7849 disclose improving the impact resistance by dissolving a rubber in monomers for constituting an aromatic vinyl resin and subjecting the monomers to bulk polymerization or suspension polymerization. JP-A-54-153884 discloses incorporating an aromatic vinyl resin with a rubber-containing multi-layer structure obtained by emulsion polymerization of a copolymerizable vinyl monomer in the presence of a rubber component made of butyl acrylate or butadiene. Besides, JP-A-55-157642 and JP-A-56-70043 disclose mixing an aromatic vinyl resin with a block copolymer containing a rubber component as represented by styrene-butadiene block copolymer. However, the former is restricted in the content of rubber from the viewpoint of solubility and, therefore, the strength is not sufficiently improved. In case of rubber-containing polymers prepared according to the latter methods, known rubber-containing polymers introduce a problem, since if it is attempted to secure the impact resistance, they must be used in a large amount such that other properties are no longer maintained. That is to say, if the amount of a rubber is increased to the extent that a desired impact resistance can be secured, characteristics such as rigidity, heat resistance and transparency that aromatic vinyl resins originally possess are lowered, so the known rubber-containing polymers are hard to be put to practical use. It is expected that if an impact strength can be imparted to aromatic vinyl resins without impairing the advantages of base resins, they could be used in wider purposes.

Accordingly, it is an object of the present invention to impart an impact strength to aromatic vinyl resins without impairing the properties such as rigidity and transparency thereof.

A further object of the present invention is to provide an aromatic vinyl resin composition having well-balanced properties such as impact resistance, rigidity, heat resistance and processability.

DISCLOSURE OF INVENTION

The present inventors have found that the impact strength of an aromatic vinyl homopolymer or a copolymer of an aromatic vinyl compound and an alkyl methacrylate can be improved without remarkably lowering the transparency of moldings made thereof by incorporation of a graft copolymer which is obtained by adding a latex of a carboxyl group-containing copolymer to a latex of a diene rubber to enhance the particle size of the rubber particles and polymerizing a vinyl monomer component in the presence of the particle size-enhanced rubber particles.

Thus, in accordance with the present invention, there is provided a thermoplastic resin composition comprising:

(A) 5 to 40% by weight of a graft copolymer obtained by polymerizing 15 to 60 parts by weight of a vinyl monomer in the presence of 85 to 40 parts by weight (dry basis) of a latex of diene rubber particles having an average particle size of 3,500 to 20,000 angstroms (the total of the vinyl monomer and the diene rubber particles being 100 parts by weight) which is obtained by adding 0.1 to 15 parts by weight (dry basis) of a latex of an acid group-containing copolymer of 5 to 25% by weight of at least one unsaturated acid selected from the group consisting of acrylic acid, methacrylic acid, itaconic acid and crotonic acid and 95 to 75% by weight of a monomer copolymerizable with the unsaturated acid to 100 parts by weight (dry basis) of a latex of diene rubber particles having an average particle size of 500 to 3,000 angstroms which is obtained by polymerization of (a1) 50 to 100% by weight of a conjugated diene monomer, (a2) 50 to 0% by weight of a vinyl monomer copolymerizable with the conjugated diene monomer, (a3) 0 to 3% by weight of a crosslinking monomer and (a4) 0 to 3% by weight of a chain transfer agent, thereby agglomerating the rubber particles to enhance the particle size of the rubber particles, and (B) 95 to 60% by weight of an aromatic vinyl polymer obtained by polymerization of (b1) 40 to 100 parts by weight of an aromatic vinyl monomer, (b2) 60 to 0 parts by weight of a methacrylic ester and (b3) 0 to 20 parts by weight of other vinyl monomer copolymerizable therewith (the total of (b1), (b2) and (b3) being 100 parts by weight).

The acid group-containing copolymer is preferably a copolymer of 5 to 25% by weight of the unsaturated acid, 5 to 30% by weight of an alkyl acrylate having a $C_1$ to $C_{12}$ alkyl group, 20 to 80% by weight of an alkyl methacrylate having a $C_1$ to $C_{12}$ alkyl group and 0 to 40% by weight of other vinyl monomers.

As the diene rubber are preferred diene rubber particles which are a product of multi-stage polymerization of a monomer mixture containing a conjugated diene monomer and a vinyl monomer copolymerizable therewith and have a layer made of the diene monomer alone or a layer containing a high content of the diene monomer.

Preferably the acid group-containing copolymer latex is prepared by firstly polymerizing 5 to 90% by weight of a monomer mixture having a lower content of an unsaturated acid and then polymerizing 95 to 10% by weight of a monomer mixture having a higher content of the unsaturated acid.

It is preferable that the difference in refractive index between the graft copolymer (A) and the aromatic vinyl copolymer (B) is not more than 0.003.

BEST MODE FOR CARRYING OUT THE INVENTION

The diene rubber used in the present invention is obtained by polymerization of (a1) 50 to 100 parts by weight of a conjugated diene monomer, (a2) 50 to 0 parts by weight of a vinyl monomer copolymerizable with the conjugated diene monomer, (a3) 0 to 3 parts by weight of a crosslinking monomer and (a4) 0 to 3 parts by weight of a chain transfer agent (the total being 100 parts by weight). Typical examples of the conjugated diene monomer are butadiene, isoprene, chloroprene and the like. These may be used alone or in admixture thereof. Examples of the copolymerizable vinyl monomer are, for instance, a vinyl monomer having an aromatic ring such as styrene, vinyl toluene or a-methylstyrene; a methacrylic ester, especially an alkyl methacrylate such as methyl methacrylate, ethyl methacrylate, propyl methacrylate or butyl methacrylate; an acrylic ester, especially an alkyl acrylate such as methyl acrylate, ethyl acrylate, propyl acrylate, butyl acrylate, or 4-hydroxybutyl acrylate which provides a high refractive index; a vinyl cyanide such as acrylonitrile or methacrylonitrile; and the like. These may be used alone or in admixture thereof.

In a field which requires moldings to be transparent, it is necessary to match the refractive index of the graft copolymer (A) obtained by polymerization of the vinyl monomer in the presence of the diene rubber with the refractive index of the aromatic vinyl resin (B) to be incorporated therewith. Since the refractive index of the aromatic vinyl resin is relatively high, a diene rubber containing a vinyl monomer having an aromatic ring is effective as the diene rubber to be used from the viewpoint of adjusting the refractive index, and a styrene-butadiene copolymer is practical. However, there is a case where, depending on an aromatic vinyl resin to be incorporated with the graft copolymer (A), adjustment of the refractive index of the diene rubber to that of the matrix resin requires a high content of the vinyl monomer having an aromatic ring because of the high refractive index of the aromatic vinyl resin, so the glass transition temperature of the copolymer rubber raises to result in lowering of performances as a rubber. In such a case, it is advantageous to conduct a polymerization of a diene monomer which constitutes the diene rubber and a vinyl monomer to be copolymerized therewith in a multi stage so that the produced diene rubber contains a layer made of the diene monomer or a layer having a high content of the diene monomer. For example, a rubber having a layer of low glass transition temperature can be prepared by polymerizing a diene monomer and a copolymerizable monomer separately wherein the diene monomer alone or a monomer mixture containing a high concentration of the diene monomer is firstly polymerized and the residual monomer is then polymerized in the presence of the produced polymer. It is also effective to carry out the polymerization in the reverse order to the above.

It is advantageous that the diene rubber used in the present invention is prepared by a usual emulsion polymerization, and it is practical that the average particle size thereof is from 500 to 3,000 angstroms. Diene rubbers having an average particle size of less than 500 angstroms are not practical since it is difficult to stably obtain them by a usual emulsion polymerization. Diene rubbers having an average particle size of more than 3,000 angstroms have a large problem in productivity since they require a long time for the polymerization.

The crosslinking monomers which can be used in the preparation of the diene rubber are compounds having at least two polymerizable functional groups in the molecule, e.g., allyl methacrylate, divinyl benzene, diallyl phthalate, and other known crosslinking agents such as divinyl compounds, allyl compounds and di(meth)acrylate compounds. As a chain transfer agent are used conventional chain transfer agents such as n-dodecylmercaptan and t-dodecylmercaptan. The crosslinking monomer and the chain transfer agent are used as occasion demands. The amount of each of them is preferably from 0 to 3 parts by weight based on 100 parts by weight of the total of the conjugated diene monomer (a1) and the copolymerizable vinyl monomer (a2). If the amount is more than 3 parts by weight, the impact resistance of final products is lowered.

The thus obtained diene rubber latex is treated to agglomerate the diene rubber particles to enhance the particle size thereof by adding a latex of an acid group-containing copolymer.

The composition of the acid group-containing copolymer and the method of treatment to enhance the particle size are not particularly limited. The particle size enhancing methods using an acid group-containing copolymer latex are known from JP-A-56-166217, JP-A-58-61102, JP-A-8-59704 and JP-A-8-157502, and these methods are applicable to the present invention. However, as a result of an intensive study concerning a method for enhancing the particle size of rubber particles by acid group-containing copolymer latex, it is advantageous for the present invention to use, as an acid group-containing copolymer, a copolymer obtained by polymerization of a monomer mixture comprising 5 to 25% by weight of at least one unsaturated acid selected from the group consisting of acrylic acid, methacrylic acid, itaconic acid and crotonic acid, 5 to 30% by weight of at least one alkyl acrylate having a $C_1$ to $C_{12}$ alkyl group, 20 to 80% by weight of at least one alkyl methacrylate having a $C_1$ to $C_{12}$ alkyl group and 0 to 40% by weight of other monomers having a vinylic unsaturated bond copolymerizable with the above monomers (the total of the monomers being 100% by weight). In particular, acrylic acid, methacrylic acid and a mixture thereof are preferred as the unsaturated acid from the viewpoint of practical use. The content of the unsaturated acid is from 5 to 25% by weight. If the content is less than 5% by weight, the particle size enhancing property is poor. If the content is more than 25% by weight, formation of aggregates and viscosity increase of the latex occur and such a copolymer is unsuitable for industrial production.

The acid group-containing copolymer latex is obtained by a usual emulsion polymerization.

The alkyl acrylates used in the production of the acid group-containing copolymer are alkyl acrylates having a $C_1$ to $C_{12}$ alkyl group, e.g., methyl acrylate, ethyl acrylate, propyl acrylate and butyl acrylate. In particular, alkyl acrylates having a $C_1$ to $C_8$ alkyl group are preferable. These may be used alone or in admixture thereof. The content of the alkyl acrylate is from 5 to 30% by weight, preferably 8 to 28% by weight. If the content is less than 5% by weight, the particle size enhancing property is low. If the content is more than 30% by weight, aggregates are formed much at the time of producing the latex.

As the alkyl methacrylate are used esters of methacrylic acid and a linear or branched alcohol having 1 to 12 carbon atoms. Examples of the alkyl methacrylate are methyl methacrylate, ethyl methacrylate, propyl methacrylate, butyl methacrylate and the like. These may be used alone or in admixture thereof. The content of the alkyl methacrylate is from 20 to 80% by weight, preferably 25 to 75% by weight. If the content is outside the above range, the particle size enhancing property tends to lower.

Examples of the copolymerizable other vinyl monomer used in the production of the acid group-containing copolymer are, for instance, an aromatic vinyl monomer such as styrene or α-methylstyrene, a vinyl cyanide monomer such as acrylonitrile or methacrylonitrile, a crosslinking monomer having at least two polymerizable functional groups in its molecule such as allyl methacrylate or polyethylene glycol dimethacrylate, and the like. These may be used alone or in admixture thereof. The content of these copolymerizable vinyl monomers is from 0 to 40% by weight, preferably 0 to 35% by weight. If the content is more than 40% by weight, the particle size enhancing property is lowered.

A chain transfer agent such as n-dodecylmercaptan or t-dodecylmercaptan may be optionally used in an amount of 0 to 3% by weight based on the monomer mixture.

Upon preparing a latex of the acid group-containing copolymer by polymerizing the above-mentioned monomer mixture, it is preferable to conduct the polymerization in such a manner that firstly a monomer mixture the amount of which is from 5 to 90% by weight, preferably 10 to 70% by weight, of the whole monomer mixture to be used and which has a lower content of an unsaturated acid is polymerized, and subsequently the residual monomers, namely a monomer mixture the amount of which is from 95 to 10% by weight, preferably 90 to 30% by weight, of the whole monomer mixture to be used and which has a higher content of an unsaturated acid is polymerized. It is preferable from the viewpoint of the particle size enhancing property that the ratio a/b of the percentage "a" of the unsaturated acid in the polymer formed in the former stage to the percentage "b" of the unsaturated acid in the polymer formed in the latter stage (ratio of the unsaturated acid content in the monomer mixture used in the former stage to the unsaturated acid content in the monomer mixture used in the latter stage) is from 0.05 to 0.95, especially 0.15 to 0.85. Further, it is preferable from the viewpoint of the particle size enhancing property that the content of the unsaturated acid in the monomer mixture used in the latter stage (the monomer mixture having a higher content of unsaturated acid) is not less than 10% by weight, especially not less than 15% by weight. If the a/b ratio is outside the above range, a very large amount of aggregates is formed during the preparation of the acid group-containing copolymer latex and, besides, the impact strength of the final products is not sufficiently improved. Preferably, the particle size of the acid group-containing copolymer latex is from 700 to 2,000 angstroms. The latex having a particle size of less than 700 angstroms is poor in particle size enhancing property. If a rubber is treated with the latex having a particle size of more than 2,000 angstroms, the content of the rubber of unenhanced particle size in the treated rubber increases, thus deteriorating the quality.

For enhancing the particle size of the diene rubber to an average particle size of 3,500 to 20,000 angstroms by means of the acid group-containing copolymer latex, the acid group-containing copolymer latex is used in an amount of 0.1 to 15 parts by weight (dry basis) per 100 parts by weight of the diene rubber. If the amount is less than 0.1 part by weight, the amount of the rubber particles of unenhanced particle size becomes large and the particle size cannot be enhanced to the desired average particle size. If the amount is more than 15 parts by weight, it is difficult to control the average particle size and, also, the physical properties of final products are lowered. From the viewpoints that the amount of diene rubber of unenhanced particle size is small and the average particle size of the particle size enhanced rubber is relatively uniform and stable, it is preferable to use the acid group-containing copolymer latex in an amount of 0.5 to 5 parts by weight (dry basis). Also, for obtaining a sufficient impact strength-imparting property, it is preferable to enhance the average particle size of the rubber particles to 3,500 to 20,000 angstroms, especially 3,500 to 9,000 angstroms.

Then, the objective rubber-containing graft copolymer (A) is prepared by using the thus obtained diene rubber having an enhanced particle size. The graft copolymer is obtained by emulsion-polymerizing 15 to 60 parts by weight of a vinyl monomer in the presence of 85 to 40 parts by weight of the particle size enhanced diene rubber particles having an average particle size of 3,500 to 20,000 angstroms (the total of the rubber particles and the vinyl monomer being 100 parts by weight).

Various vinyl compounds can be used as the vinyl monomer for grafting. Examples of the vinyl monomer are, for instance, an alkyl methacrylate such as methyl methacrylate, especially an alkyl methacrylate having a $C_1$ to $C_{12}$ alkyl group, an alkyl acrylate such as butyl acrylate, especially an alkyl acrylate having a $C_1$ to $C_{12}$ alkyl group, a vinyl cyanide compound such as acrylonitrile or methacrylonitrile, an aromatic vinyl monomer such as styrene, a-methylstyrene, p-methylstyrene or chlorostyrene, and the like. These may be used alone or in admixture thereof.

When a transparency is required for moldings prepared from the resin composition of the present invention, it is preferable that the difference in refractive index between the obtained graft copolymer and an aromatic vinyl resin to be incorporated therewith is not more than 0.003, especially not more than 0.0004. If the difference is more than 0.003, the obtained moldings are substantially opaque. The refractive index as herein referred to is of course found values, but it is convenient to estimate the refractive index, as a measure for determining the formulation, by calculation from refractive index values disclosed in literatures such as Polymer Handbook.

The thermoplastic resins used in the present invention, namely the aromatic vinyl resins (B), are polymers obtained by polymerization of a monomer component comprising 40 to 100% by weight of an aromatic vinyl monomer, 60 to 0% by weight of a methacrylic ester and 0 to 20% by weight of other vinyl monomers copolymerizable with them (100% by weight in total). When a transparency is not sought, it is not necessary to particularly pay attention to the composition of the aromatic vinyl resin. However, if the refractive index of the aromatic vinyl resin becomes too high, the amount of the diene monomer in the graft copolymer must be decreased when it is desired to match the refractive index of the graft copolymer with that of the aromatic vinyl resin to obtain a transparency, so it becomes difficult to impart an impact resistance. Therefore, as the aromatic vinyl resin is preferred a copolymer of 40 to 80% by weight of an aromatic vinyl monomer, 60 to 20% by weight of a methacrylic ester and 0 to 20% by weight of other vinyl monomers copolymerizable with them. If the content of the aromatic vinyl monomer is less than 40% by weight, the properties of the aromatic vinyl resin are impaired to particularly lower the rigidity and it is economically disadvantageous.

Typical examples of the aromatic vinyl monomer used as a main component of the thermoplastic aromatic vinyl resin are styrene, vinyl toluene, α-methylstyrene and the like. These may be used alone or in admixture thereof. Examples of the methacrylic ester are alkyl methacrylates such as methyl methacrylate, ethyl methacrylate, propyl methacrylate and butyl methacrylate. Alkyl methacrylates having a $C_1$ to $C_4$ alkyl group are practical. These may be used alone or in admixture thereof. Examples of the other vinyl monomers copolymerizable with the aromatic vinyl monomer and the methacrylic ester are acrylic esters, especially alkyl acrylates such as methyl acrylate, ethyl acrylate, propyl acrylate and butyl acrylate. Vinyl cyanide compounds such as acrylonitrile and methacrylonitrile can also be used as the other copolymerizable vinyl monomers. The other copolymerizable monomers may be used alone or in admixture thereof.

The impact resistant aromatic vinyl resin composition of the present invention is obtained by melt-mixing 5 to 40% by weight of the graft copolymer (A) containing a rubber having a particle size enhanced by means of the acid group-containing copolymer and 95 to 60% by weight of the aromatic vinyl resin (B). At that time, usual additives such as various stabilizers, lubricant, pigment, filler and the like can be used in such amounts that the advantages of the aromatic vinyl resin are not impaired. Molded articles can be prepared from the thus obtained mixture by extrusion, injection molding or the like.

The composition of the present invention is more specifically described and explained by means of the following examples in which all parts and % are by weight unless otherwise noted. It is to be understood that the present invention is not limited to these examples.

In the examples, measurement of the average particle size was carried out using Microtrack Particle Size Analyzer Model 9230 UPA made by Nikkiso Kabushiki Kaisha.

EXAMPLE 1

(1) Preparation of Butadiene-styrene Rubber

A 100 liter pressure polymerization reactor was charged with 200 parts of water and 0.2 part of potassium persulfate. After purging the reactor with nitrogen gas, 1 part of sodium oleate, 2 parts of rosined sodium soap, 60 parts of butadiene and 40 parts of styrene were added to the reactor with stirring. The temperature of the reactor was elevated to 60° C. to initiate the polymerization, and the polymerization was carried out for 12 hours. The polymerization conversion was 96%, and the average particle size of the obtained rubber latex was 860 angstroms.

(2) Preparation of Acid Group-containing Copolymer Latex

An 8 liter polymerization reactor was charged with 200 parts of water and 0.5 part of sodium dioctrylsulfosuccinate. After elevating the temperature to 70° C. in a nitrogen gas stream with stirring, 0.3 part of formaldehyde sodium sulfoxylate, 0.0025 part of ferrous sulfate and 0.01 part of disodium ethylenediaminetetraacetate were added to the reactor. Several minutes later, a mixture of 2 parts of butyl methacrylate, 23 parts of butyl acrylate, 2 parts of methacrylic acid, 0.125 part of t-dodecylmercaptan and 0.025 part of cumene hydroperoxide was continuously added dropwise to the reactor at a rate of 20 parts/hour by a constant flow pump. After the completion of the addition, a mixture of 58 parts of butyl methacrylate, 2 parts of butyl acrylate, 13 parts of methacrylic acid, 0.3 part of t-dodecylmercaptan and 0.08 part of cumene hydroperoxide was further added dropwise to the reactor at a rate of 20 parts/hour. The polymerization was terminated 1.5 hours after the completion of the addition. The polymerization conversion was 99.7%. The obtained latex had an average particle size of 1,050 angstroms, a solid concentration of 33% and a pH of 2.8.

(3) Preparation of Particle Size Enhanced Rubber

An 8 liter polymerization reactor was charged with 100 parts (dry basis) of the butadiene-styrene rubber latex prepared in (1) and 20 parts of water, and the temperature was elevated to 60° C. with stirring in a nitrogen gas stream. To the reactor were added 0.1 part of sodium hydroxide and 3 parts (dry basis) of the acid group-containing copolymer latex prepared in (2), and the mixture was stirred for 1 hour, thereby agglomerating the butadiene-styrene rubber particles to enhance the particle size thereof. To the reactor were added 200 parts of water and 0.4 part of sodium dodecylbenzenesulfonate. The mixture was stirred for 30 minutes and the particle size enhancing operation was terminated to give a particle size enhanced rubber having an average particle size of 6,600 angstroms.

(4) Graft Copolymerization onto Particle Size Enhanced Rubber

An 8 liter polymerization reactor was charged with 70 parts (dry basis) of the latex of particle size enhanced butadiene-styrene rubber obtained in (3). After elevating the temperature to 60° C. in a nitrogen gas stream with stirring, 0.18 part of formaldehyde sodium sulfoxylate, 0.001 part of ferrous sulfate and 0.004 part of disodium ethylenediaminetetraacetate were added to the reactor, and subsequently 30 parts of a monomer mixture of 12 parts of methyl methacrylate and 18 parts of styrene, to which 0.2 part of t-butyl hydroperoxide was added, was continuously added dropwise to the reactor at a rate of 10 parts/hour by a constant flow pump. During the addition of the monomer mixture, 0.2 part of sodium dodecylbenzenesulfonate was added to the reactor 4 times every one hour for the purpose of keeping the stability of the latex. After the completion of the addition of the monomer mixture, the reaction mixture was further stirred for 1 hour to complete the polymerization. The polymerization conversion was 99.7%. The obtained latex had an average particle size of 7,600 angstroms. After adding 0.5 part of dilauryl-3,3'-thiodipropionate (DLTP) and 0.5 part of 2,6-di-t-butyl-4-methylphenol (BHT) to the latex, 5 parts of calcium chloride was added to the latex to salt out the produced graft copolymer, followed by heat treatment at 90° C. The graft copolymer were dehydrated and dried to give a dry powder. The refractive index of the graft copolymer was 1.546.

(5) Preparation of Aromatic Vinyl Copolymer

An aromatic vinyl copolymer comprising styrene and methyl methacrylate was prepared by suspension polymerization in the following manner.

A 100 liter polymerization reactor was charged with 200 parts of water, 0.02 part of sodium dodecylbenzenesulfonate and 1 part of calcium phosphate. After thoroughly expelling oxygen, the temperature was elevated to 85° C., and then 55 parts of styrene, 45 parts of methyl methacrylate and 0.8 part of benzoyl peroxide were added all at once. The reaction was carried out for 5 hours with stirring. The obtained polymer was dehydrated and dried to give a powder of an aromatic vinyl resin. It had a refractive index of 1.546.

(6) Preparation of Impact Resistant Aromatic Vinyl Resin Composition and Evaluation of the Physical Properties Thereof There were mixed 75% of the aromatic vinyl copolymer prepared in (5), 25% of the graft copolymer prepared in (4) and 0.1% of a hindered phenol stabilizer, and the mixture was melt-kneaded using an extruder Model HW-40-28 made by Tabata Kikai Kabushiki Kaisha to give pellets of an impact resistant polystyrene resin composition. The pellets were then molded by an injection molding machine Model 160MSP10 made by Mitsubishi Heavy Industries, Ltd. to give plates having a size of 150 mm×100 mm×3 mm for measurement of transparency and test pieces for measurement of Izod impact strength.

The Izod impact strength was measured according to ASTM D-256 and the haze was measured according to JIS K 6714 to evaluate the impact resistance and the transparency. The heat distortion temperature (HDT) was measured according to JIS K 7207A, load 18.6 kg.

The results are shown in Table 1.

EXAMPLE 2

The procedure of Example 1 was repeated except that in the preparation of the butadiene-styrene rubber, 60 parts of butadiene was firstly polymerized and 40 parts of styrene was then polymerized in the presence of the obtained polymer. The average particle size of the obtained particle size enhanced rubber was 6,100 angstroms. The results are shown in Table 1.

EXAMPLE 3

The procedure of Example 1 was repeated except that the preparation of the butadiene-styrene rubber was carried out by firstly polymerizing 60 parts of butadiene and then polymerizing 40 parts of styrene in the presence of the obtained polymer, and the acid group-containing copolymer was used in an amount of 1.8 parts (dry basis) based on 100 parts of the thus obtained butadiene-styrene rubber. The average particle size of the obtained particle size enhanced rubber was 9,100 angstroms. The results are shown in Table 1.

COMPARATIVE EXAMPLE 1

In the presence of 70 parts of the butadiene-styrene rubber obtained in (1) of Example 1, 12 parts of methyl methacrylate and 18 parts of styrene were emulsion-polymerized to give a graft copolymer having an average particle size of 1,100 angstroms without agglomerating the rubber particles to enhance the particle size by means of the acid group-containing copolymer latex. Thereafter, an aromatic vinyl resin composition was prepared and evaluated in the same manner as in Example 1. The results are shown in Table 1.

COMPARATIVE EXAMPLE 2

After adding 2.5 parts of sodium sulfate to 70 parts (dry basis) of the butadiene-styrene rubber latex obtained in (1) of Example 1, 12 parts of methyl methacrylate and 18 parts of styrene were polymerized in the latex to give a graft copolymer having an average particle size of 1,800 angstroms. Thereafter, an aromatic vinyl resin composition was prepared and evaluated in the same manner as in Example 1. The results are shown in Table 1.

COMPARATIVE EXAMPLE 3

In the presence of 70 parts of the butadiene-styrene rubber prepared in Example 2, 12 parts of methyl methacrylate and 18 parts of styrene were emulsion-polymerized to give a graft copolymer having an average particle size of 1,100 angstroms without conducting the particle size enhancement by means of acid group-containing copolymer latex. Thereafter, an aromatic vinyl resin composition was prepared and evaluated in the same manner as in Example 1. The results are shown in Table 1.

COMPARATIVE EXAMPLE 4

After adding 2.5 parts of sodium sulfate to 70 parts (dry basis) of the butadiene-styrene rubber latex obtained in Example 2, 12 parts of methyl methacrylate and 18 parts of styrene were polymerized in the latex to give a graft copolymer having an average particle size of 1,900 angstroms. Thereafter, an aromatic vinyl resin composition was prepared and evaluated in the same manner as in Example 1. The results are shown in Table 1.

COMPARATIVE EXAMPLE 5

An aromatic vinyl resin composition was prepared and evaluated in the same manner as in Example 1 except that the aromatic vinyl copolymer was used alone without adding any graft copolymer thereto. The results are shown in Table 1.

TABLE 1

| | Izod impact strength at 23° C. (kg · cm/cm$^2$) | Izod impact strength at 0° C. (kg · cm/cm$^2$) | Haze (%) | Heat distortion temp. (° C.) |
|---|---|---|---|---|
| Ex. 1 | 10 | 6.1 | 4.7 | 95 |
| Ex. 2 | 14 | 9.2 | 4.1 | 94 |
| Ex. 3 | 17 | 11.5 | 4.9 | 96 |
| Com. Ex. 1 | 2 | 1.5 | 2.5 | 96 |
| Com. Ex. 2 | 6 | 2.3 | 3.5 | 95 |
| Com. Ex. 3 | 2 | 1.5 | 2.3 | 96 |
| Com. Ex. 4 | 7 | 2.1 | 3.6 | 95 |
| Com. Ex. 5 | 1.8 | 1.2 | 1.9 | 98 |

EXAMPLE 4

(1) Preparation of Butadiene-styrene Rubber

A 100 liter pressure polymerization reactor was charged with 200 parts of water and 0.2 part of potassium persulfate. After purging the reactor with nitrogen gas, 1 part of sodium oleate, 2 parts of rosined sodium soap, 71.5 parts of butadiene and 28.5 parts of styrene were added to the reactor with stirring. The temperature of the reactor was elevated to 60° C. to initiate the polymerization, and the polymerization was carried out for 12 hours. The polymerization conversion was 97%, and the average particle size of the obtained rubber latex was 890 angstroms.

(2) Preparation of Particle Size Enhanced Rubber

An 8 liter polymerization reactor was charged with 100 parts (dry basis) of the butadiene-styrene rubber latex prepared in (1) and 20 parts of water, and the temperature was elevated to 60° C. with stirring in a nitrogen gas stream. To the reactor were added 0.1 part of sodium hydroxide and 3 parts (dry basis) of an acid group-containing copolymer latex prepared in the same manner as in Example 1, and the butadiene-styrene rubber particles were agglomerated to enhance the particle size thereof in the same manner as in Example 1 to give a particle size enhanced butadiene-styrene rubber having an average particle size of 6,900 angstroms.

(3) Graft Copolymerization onto Particle Size Enhanced Butadiene-styrene Rubber

An 8 liter polymerization reactor was charged with 70 parts (dry basis) of the latex of particle size enhanced butadiene-styrene rubber obtained in (2). After elevating the temperature to 60° C. in a nitrogen gas stream with stirring, 0.18 part of formaldehyde sodium sulfoxylate, 0.001 part of ferrous sulfate and 0.004 part of disodium ethylenediaminetetraacetate were added to the reactor. Graft polymerization was then carried out in the same manner as in Example 1 by using 30 parts of a monomer mixture of 14.7 parts of methyl methacrylate and 15.3 parts of styrene. The obtained graft copolymer had an average particle size of 7,800 angstroms and a refractive index of 1.537.

(4) Preparation of Aromatic Vinyl Copolymer

An aromatic vinyl copolymer comprising styrene, methyl methacrylate and acrylonitrile was prepared by suspension polymerization in the following manner.

A 100 liter polymerization reactor was charged with 200 parts of water, 0.02 part of sodium dodecylbenzenesulfonate and 1 part of calcium phosphate. After thoroughly expelling oxygen, the temperature was elevated to 85° C., and then 43.5 parts of styrene, 47.5 parts of methyl methacrylate, 9 parts of acrylonitrile and 0.8 part of benzoyl peroxide were added all at once. The reaction was carried out for 5 hours with stirring. The obtained polymer was dehydrated and dried to give a styrene resin. It had a refractive index of 1.537.

(5) Preparation of Impact Resistant Aromatic Vinyl Resin Composition

There were mixed 75% of the aromatic vinyl resin prepared in (4), 25% of the graft copolymer prepared in (3) and 0.1% of a hindered phenol stabilizer, and a resin composition was prepared and evaluated in the same manner as in Example 1.

The results are shown in Table 2.

COMPARATIVE EXAMPLE 6

After adding 2.5 parts of sodium sulfate to 70 parts (dry basis) of the butadiene-styrene rubber latex obtained in (1) of Example 4, 16.5 parts of methyl methacrylate and 13.5 parts of styrene were polymerized in the latex to give a graft copolymer having an average particle size of 1,800 angstroms. Thereafter, an aromatic vinyl resin composition was prepared and evaluated in the same manner as in Example 4. The results are shown in Table 2.

COMPARATIVE EXAMPLE 7

An aromatic vinyl resin composition was prepared and evaluated in the same manner as in Example 4 except that the aromatic vinyl resin was used alone without adding any graft copolymer thereto. The results are shown in Table 2.

TABLE 2

|  | Izod impact strength at 23° C. (kg · cm/cm$^2$) | Izod impact strength at 0° C. (kg · cm/cm$^2$) | Haze (%) | Heat distortion temp. (° C.) |
| --- | --- | --- | --- | --- |
| Ex. 4 | 14 | 8.2 | 4.5 | 94 |
| Com. Ex. 6 | 8.5 | 2.4 | 2.8 | 95 |
| Com. Ex. 7 | 2.1 | 1.3 | 1.8 | 98 |

INDUSTRIAL APPLICABILITY

The aromatic vinyl resin composition of the present invention provides molded articles having an improved impact resistance as compared with conventional one while maintaining properties of aromatic vinyl resins such as heat resistance and transparency.

The invention claimed is:

1. A thermoplastic resin composition comprising:
  (A) 5 to 40% by weight of a graft copolymer, and
  (B) 95 to 60% by weight of an aromatic vinyl polymer obtained by polymerization of (b1) 40 to 80 parts by weight of an aromatic vinyl monomer, (b2) 60 to 20 parts by weight of a methacrylic ester and (b3) 0 to 20 parts by weight of other vinyl monomer copolymerizable therewith (the total of (b1), (b2) and (b3) being 100 parts by weight), wherein said graft copolymer is obtained by:
  preparing a latex of layered diene rubber particles having an average particle size of 500 to 3,000 angstroms and having a layer (i) and a layer (ii) and comprising (a1) at least 50% by weight of a conjugated diene monomer, (a2) a vinyl monomer copolymerizable with said conjugated diene monomer, (a3) 0 to 3% by weight of a crosslinking monomer and (a4) 0 to 3% by weight of a chain transfer agent by subjecting said monomers to multi-stage polymerization so as to form said layer (i) and said layer (ii) in separate stages, wherein said layer (i) comprises said copolymerizable vinyl monomer (a2), and said layer (ii) comprises said conjugated diene monomer (a1) alone or a higher content of said diene monomer than the content of said diene monomer in layer (i),
  adding to 100 parts by weight (dry basis) of said latex of layered diene rubber particles having an average particle size of 500 to 3,000 angstroms 0.1 to 15 parts by weight (dry basis) of an acid group-containing copolymer latex prepared by polymerization of a monomer mixture comprising 5 to 25% by weight of at least one unsaturated acid selected from the group consisting of acrylic acid, methacrylic acid, itaconic acid and crotonic acid and 95 to 75% by weight of a monomer copolymerizable with said unsaturated acid (the total of the unsaturated acid and the monomer being 100% by weight), thereby agglomerating said rubber particles to give a latex of agglomerated diene rubber particles having an average particle size of 3,500 to 20,000 angstroms, and
  polymerizing 15 to 60 parts by weight of a vinyl monomer in the presence of 85 to 40 parts by weight (dry basis) of said latex of agglomerated diene rubber particles (the total of said vinyl monomer and said diene rubber particles being 100 parts by weight).

2. The composition of claim 1, wherein said acid group-containing copolymer is a copolymer of 5 to 25% by weight of said unsaturated acid, 5 to 30% by weight of an alkyl acrylate having a $C_1$ to $C_{12}$ alkyl group, 20 to 80% by weight of an alkyl methacrylate having a $C_1$ to $C_{12}$ alkyl group and 0 to 40% by weight of other vinyl monomers.

3. The composition of claim 1 or 2, wherein said latex of acid group-containing copolymer is prepared by polymerizing a first monomer mixture polymerizing a second monomer mixture, wherein said first monomer mixture constitutes 5 to 90% by weight of the whole monomer mixture to be polymerized, wherein said second monomer mixture constitutes 95 to 10% by weight of the whole monomer mixture to be polymerized, and wherein the unsaturated acid content of said second monomer mixture is greater than the unsaturated acid content of said first monomer mixture.

4. The composition of claim 1 or 2, wherein the difference in refractive index between said graft copolymer (A) and said aromatic vinyl copolymer (B) is not more than 0.003.

5. A thermoplastic resin composition comprising:
  (A) 5 to 40% by weight of a graft copolymer, and (B) 95 to 60% by weight of an aromatic vinyl polymer obtained by polymerization of (b1) 40 to 80 parts by weight of an aromatic vinyl monomer, (b2) 60 to 20 parts by weight of a methacrylic ester and (b3) 0 to 20 parts by weight of other vinyl monomer copolymerizable therewith (the total of (b1), (b2) and (b3) being 100 parts by weight), wherein said graft copolymer (A) is obtained by:

(1) preparing a latex of diene rubber particles having a layer (i) and a layer (ii) and comprising (a1) at least 50% by weight of a conjugated diene monomer, (a2) at most 50% by weight of a vinyl monomer copolymerizable with said conjugated diene monomer, (a3) 0 to 3% by weight of a crosslinking monomer and (a4) 0 to 3% by weight of a chain transfer agent by subjecting said monomers to multi-stage polymerization so as to form said layer (i) and said layer (ii) in separate stages, wherein said layer (i) comprises said copolymerizable vinyl monomer (a2), and said layer (ii) comprises said conjugated diene monomer alone or a higher content of said diene monomer than the content of said diene monomer in layer (i), (2) preparing an acid group-containing copolymer latex by polymerization of a monomer mixture of 5 to 25% by weight of at least one unsaturated acid selected from the group consisting of acrylic acid, methacrylic acid, itaconic acid and crotonic acid and 95 to 75% by weight of a monomer copolymerizable with said unsaturated acid (the total of the unsaturated acid and the monomer being 100% by weight), (3) agglomerating rubber particles of step (1) by adding 0.1 to 15 parts by weight (dry basis) of said acid group-containing copolymer latex prepared by step (2) to 100 parts by weight (dry basis) of said latex prepared by step (1), and (4) polymerizing 15 to 60 parts by weight of a vinyl monomer in the presence of 85 to 40 parts by weight (dry basis) of a latex of agglomerated diene rubber particles from step (3).

6. The composition of claim 5, wherein said acid group-containing copolymer is a copolymer of 5 to 25% by weight of said unsaturated acid, 5 to 30% by weight of an alkyl acrylate having a $C_1$ to $C_{12}$ alkyl group, 20 to 80% by weight of an alkyl methacrylate having a $C_1$ to $C_{12}$ alkyl group and 0 to 40% by weight of other vinyl monomers.

7. The composition of claim 5 or 6, wherein said latex of acid group-containing copolymer is prepared by polymerizing a first monomer mixture and subsequently polymerizing a second monomer mixture, wherein said first monomer mixture constitutes 5 to 90% by weight of the whole monomer mixture to be polymerized, wherein said second monomer mixture constitutes 95 to 10% by weight of the whole monomer mixture to be polymerized, and wherein the unsaturated acid content of said second monomer mixture is greater than the unsaturated acid content of said first monomer mixture.

8. The composition of claim 5 or 6, wherein the difference in refractive index between said graft copolymer (A) and said aromatic vinyl copolymer (B) is not more than 0.003.

9. The composition of claim 1 or 5, wherein layer (ii) of said diene rubber particles is firstly polymerized, and then layer (i) is polymerized over layer (ii).

10. The composition of claim 5, wherein said vinyl monomer (a2) is selected from the group consisting of vinyl monomers having an aromatic ring, methacrylic esters, acrylic esters, vinyl cyanides and mixtures thereof.

11. The composition of claim 5, wherein said vinyl monomer (a2) is selected from the group consisting of styrene, vinyl toluene, α-methylstyrene methyl methacrylate, ethyl methacrylate, propyl methacrylate, butyl methacrylate, methyl acrylate, ethyl acrylate, propyl acrylate, butyl acrylate, 4-hydroxybutyl acrylate, acrylonitrile, methacrylonitrile and mixtures thereof.

12. The composition of claim 1 or 5, wherein said monomer group containing (a1) at least 50% by weight of a conjugated diene monomer, (a2) a vinyl monomer copolymerizable with said conjugated diene monomer, (a3) 0 to 3% by weight of a crosslinking monomer and (a4) 0 to 3% by weight of a chain transfer agent is subjected to multi-stage polymerization, such that the conjugated diene monomer is first polymerized to form first layer (ii), and the copolymerizable vinyl monomer is subsequently polymerized with or without the conjugated diene monomer to form second layer (i).

13. The composition of claim 1 or 5, wherein said monomer group containing (a1) at least 50% by weight of a conjugated diene monomer, (a2) a vinyl monomer copolymerizable with said conjugated diene monomer, (a3) 0 to 3% by weight of a crosslinking monomer and (a4) 0 to 3% by weight of a chain transfer agent is subjected to multi-stage polymerization, such that copolymerizable vinyl monomer is first polymerized to form first layer (i), and the conjugated diene monomer is subsequently polymerized with or without the copolymerizable vinyl monomer to form second layer (ii).

14. The composition of claim 1 or 5, wherein said monomer group containing (a1) at least 50% by weight of a conjugated diene monomer, (a2) a vinyl monomer copolymerizable with said conjugated diene monomer, (a3) 0 to 3% by weight of a crosslinking monomer and (a4) 0 to 3% by weight of a chain transfer agent is subjected to multi-stage polymerization, such that the conjugated diene monomer is first copolymerized with the copolymerizable vinyl monomer to form first layer (ii), to which the conjugated diene monomer and the copolymerizable vinyl monomer are added and polymerized to form second layer (i).

15. The composition of claim 1 or 5, wherein said monomer group containing (a1) at least 50% by weight of a conjugated diene monomer, (a2) a vinyl monomer copolymerizable with said conjugated diene monomer, (a3) 0 to 3% by weight of a crosslinking monomer and (a4) 0 to 3% by weight of a chain transfer agent is subjected to multi-stage polymerization, such that the copolymerizable vinyl monomer is first copolymerized with the conjugated diene monomer to form first layer (i), to which the conjugated diane monomer and the copolymerizable vinyl monomer are added and polymerized to form second layer (ii).

* * * * *